(12) United States Patent
Tang et al.

(10) Patent No.: US 10,389,192 B2
(45) Date of Patent: Aug. 20, 2019

(54) PLASTIC-PACKAGED STATOR AND EXTERNAL ROTOR MOTOR COMPRISING THE SAME

(71) Applicant: Zhongshan Broad-Ocean Motor Manufacturing Co., Ltd., Zhongshan (CN)

(72) Inventors: Songfa Tang, Zhongshan (CN); Qingmei Jiao, Zhongshan (CN)

(73) Assignee: ZHONGSHAN BROAD-OCEAN MOTOR MANUFACTURING CO., LTD., Zhongshan (CN)

( * ) Notice: Subject to any disclaimer, the term of this patent is extended or adjusted under 35 U.S.C. 154(b) by 307 days.

(21) Appl. No.: 15/371,133

(22) Filed: Dec. 6, 2016

(65) Prior Publication Data
US 2017/0085140 A1    Mar. 23, 2017

Related U.S. Application Data

(63) Continuation-in-part of application No. PCT/CN2015/090107, filed on Sep. 21, 2015.

(30) Foreign Application Priority Data

Apr. 28, 2015 (CN) .................... 2015 2 0264443 U

(51) Int. Cl.
*H02K 1/18* (2006.01)
*H02K 11/00* (2016.01)
*H02K 11/20* (2016.01)
*H02K 1/14* (2006.01)
*H02K 1/27* (2006.01)
(Continued)

(52) U.S. Cl.
CPC ............. *H02K 1/187* (2013.01); *H02K 1/146* (2013.01); *H02K 1/18* (2013.01); *H02K 1/2786* (2013.01); *H02K 3/18* (2013.01); *H02K 3/522* (2013.01); *H02K 7/08* (2013.01); *H02K 11/00* (2013.01); *H02K 11/20* (2016.01); *H02K 11/215* (2016.01); *H02K 11/33* (2016.01); *H02K 15/12* (2013.01); *H02K 1/148* (2013.01)

(58) Field of Classification Search
CPC ............ H02K 1/18; H02K 1/187; H02K 5/00; H02K 5/02; H02K 5/04; H02K 5/08; H02K 5/14; H02K 5/15; H02K 5/16; H02K 5/167; H02K 5/24
USPC ......................................... 310/43, 66, 89, 90
See application file for complete search history.

(56) References Cited

U.S. PATENT DOCUMENTS

| | | | | |
|---|---|---|---|---|
| 7,893,591 B2 * | 2/2011 | Myojin | ................... | H02K 1/276 310/156.53 |
| 2015/0159656 A1 * | 6/2015 | Urabe | ...................... | H02K 1/02 165/104.31 |
| 2015/0318762 A1 * | 11/2015 | O | .............................. | H02K 7/14 310/43 |

* cited by examiner

*Primary Examiner* — Nguyen Tran

(74) *Attorney, Agent, or Firm* — Matthias Scholl P.C.; Matthias Scholl

(57) ABSTRACT

A plastic-packaged stator includes a sleeve base, a plurality of tooth assemblies, and a plastic-packaged body. Each tooth assembly includes an iron core including a plurality of laminated silicon steel sheets, a terminal insulator, and coil windings. The terminal insulator is disposed on one end of the iron core. The coil windings are coiled on the terminal insulator. A plurality of lug bosses is circumferentially disposed at intervals on the outer wall surface of the sleeve base. An inner end of the iron core includes slots. The tooth assemblies are circumferentially disposed on the outer wall surface of the sleeve base. The lug bosses are embedded in the slots. The plastic-packaged body integrates the sleeve base with the tooth assemblies.

11 Claims, 10 Drawing Sheets

(51) Int. Cl.
*H02K 3/18* (2006.01)
*H02K 7/08* (2006.01)
*H02K 3/52* (2006.01)
*H02K 15/12* (2006.01)
*H02K 11/215* (2016.01)
*H02K 11/33* (2016.01)

PLASTIC-PACKAGED STATOR AND EXTERNAL ROTOR MOTOR COMPRISING THE SAME

CROSS-REFERENCE TO RELATED APPLICATIONS

This application is a continuation-in-part of International Patent Application No. PCT/CN2015/090107 with an international filing date of Sep. 21, 2015, designating the United States, now pending, and further claims foreign priority benefits to Chinese Patent Application No. 201520264443.1 filed Apr. 28, 2015. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to a plastic-packaged stator and an external rotor motor comprising the same.

Description of the Related Art

Conventional stator is costly and inefficient to produce, has low structural integrity, and is prone to failure during long-term use.

SUMMARY OF THE INVENTION

In view of the above-described problems, it is one objective of the invention to provide a plastic-packaged stator and an external rotor motor comprising the same. The plastic-packaged stator is high in structural intensity, thus is reliable, and safe for long term use. The production cost in the embodiments of the present invention is reduced because relatively fewer materials are used.

To achieve the above objective, in accordance with one embodiment of the invention, there is provided a plastic-packaged stator, comprising a sleeve base, a plurality of tooth assemblies, and a plastic-packaged body. Each tooth assembly comprises an iron core comprising a plurality of laminated silicon steel sheets, a terminal insulator, and coil windings. The terminal insulator is disposed on one end of the iron core. The coil windings are coiled on the terminal insulator. A plurality of lug bosses is circumferentially disposed at intervals on an outer wall surface of the sleeve base. An inner end of the iron core comprises slots. The tooth assemblies are circumferentially disposed on the outer wall surface of the sleeve base. The lug bosses are embedded in the slots. The plastic-packaged body integrates the sleeve base with the tooth assemblies.

In a class of this embodiment, one side of the inner end of the iron core is provided with a bulge, and the other side is provided with a notch. The tooth assemblies are circumferentially disposed on the outer wall surface of the sleeve base. The bulge of one iron core is embedded in the notch of an adjacent iron core.

In a class of this embodiment, a bump is disposed between two adjacent lug bosses on the outer wall surface of the sleeve base. An axial extension length of the bump is smaller than an axial extension length of the lug bosses, and an open slot is formed between the bump and the lug bosses.

In a class of this embodiment, a Hall plate assembly is disposed on the tooth assemblies. A socket is disposed on the Hall plate assembly. The plastic-packaged body is sleeved on the Hall plate assembly, and the socket protrudes from the plastic-packaged body.

In a class of this embodiment, the socket comprises a three-position plug socket and a five-position plug socket. The three-position plug socket is adapted to introduce three-phase line of the tooth assembly, and the five-position plug socket is adapted to connect the Hall plate assembly.

In a class of this embodiment, a plurality of supporting arms protrudes out of the sleeve base. Mounting holes are disposed on an external end of the supporting arms. The plastic-packaged body is sleeved on the supporting arms, with the mounting holes exposed.

An external rotor motor comprises a rotary shaft, a plastic-packaged stator, and an external rotor. The plastic-packaged stator comprises a sleeve base. Bearing housings are disposed on two ends of the sleeve base. Each bearing housing comprises a bearing. The rotary shaft is disposed in the sleeve base, and two ends of the rotary shaft are supported by the bearing. The external rotor is sleeved on the plastic-packaged stator. The external rotor comprises a shell sleeve and a plurality of permanent magnets. The permanent magnets are mounted on an inner wall surface of the shell sleeve. One end of the rotary shaft protrudes out from the sleeve base and is connected to the shell sleeve. The plastic-packaged stator comprises a plurality of tooth assemblies and a plastic-packaged body. Each tooth assembly comprises an iron core comprising a plurality of laminated silicon steel sheets, a terminal insulator, and coil windings. The terminal insulator is disposed on one end of the iron core. The coil windings are coiled on the terminal insulator. A plurality of lug bosses is circumferentially disposed at intervals on an outer wall surface of the sleeve base. An inner end of the iron core comprises slots. The tooth assemblies are circumferentially disposed on the outer wall surface of the sleeve base. The lug bosses are embedded in the slots. The plastic-packaged body integrates the sleeve base with the tooth assemblies.

In a class of this embodiment, a controller is mounted on the plastic-packaged body.

In a class of this embodiment, a plurality of supporting arms protrudes out of the sleeve base. Mounting holes are disposed on an external end of the supporting arms. The plastic-packaged body is sleeved on the supporting arms, with the mounting holes exposed. The controller is screwed on the mounting holes via screws.

Advantages of the plastic-packaged stator and the external rotor motor according to embodiments of the invention are summarized as follows:

1. A plurality of lug bosses is circumferentially disposed at intervals on an outer wall surface of the sleeve base. An inner end of the iron core comprises slots. The tooth assemblies are circumferentially disposed on the outer wall surface of the sleeve base. The lug bosses are embedded in the slots. The plastic-packaged body integrates the sleeve base with the tooth assemblies. Each tooth assembly comprises an iron core comprising a plurality of laminated silicon steel sheets. The arrangement is simple. Waste produced during production process is reduced, thus production cost is saved. Meanwhile, the plastic-packaged stator is high in structural intensity, thus is reliable, and safe for long term use.

2. One side of the inner end of the iron core is provided with a bulge, and the other side is provided with a notch. The tooth assemblies are circumferentially disposed on the outer wall surface of the sleeve base. The bulge of one iron core is embedded in the notch of an adjacent iron core. The arrangement is simple. Therefore, on the one hand, the positioning and installation of tooth assemblies are easy, on the other hand, the connection between the tooth assemblies is reliable.

3. A bump is disposed between two adjacent lug bosses on the outer wall surface of the sleeve base. An axial extension length of the bump is smaller than an axial extension length of the lug bosses. The bump is used for positioning. The tooth assemblies are compressed on the outer wall surface of the sleeve base, and the installation is stopped when the tooth assemblies reach the bump. An open slot is formed between the bump and the lug bosses. During the installation, aluminum scraps are produced between the slot on the inner end of the tooth assemblies and the lug bosses on the outer wall surface of the sleeve base, and the aluminum scraps can be accommodated in the open slot instead of anywhere else, thus the aluminum scraps do not stand in the way of the installation of the tooth assemblies. The stator is well-designed, reliable, and features high quality.

4. A Hall plate assembly is disposed on the tooth assemblies. A socket is disposed on the Hall plate assembly. The plastic-packaged body is sleeved on the Hall plate assembly, and the socket protrudes from the plastic-packaged body. The arrangement is simple, thus facilitating the establishment of electrical connection between the plastic-packaged stator and the external power supply, or electrical connection between the plastic-packaged stator and the controller.

5. A plurality of supporting arms protrudes out of the sleeve base. Mounting holes are disposed on an external end of the supporting arms. The plastic-packaged body is sleeved on the supporting arms, with the mounting holes exposed. The arrangement is simple and the assembly is convenient. The structural intensity of the stator is improved.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a plastic-packaged stator and an external rotor motor comprising the same are described below. It should be noted that the following examples are intended to describe and not to limit the invention.

Example 1

Figure 1:
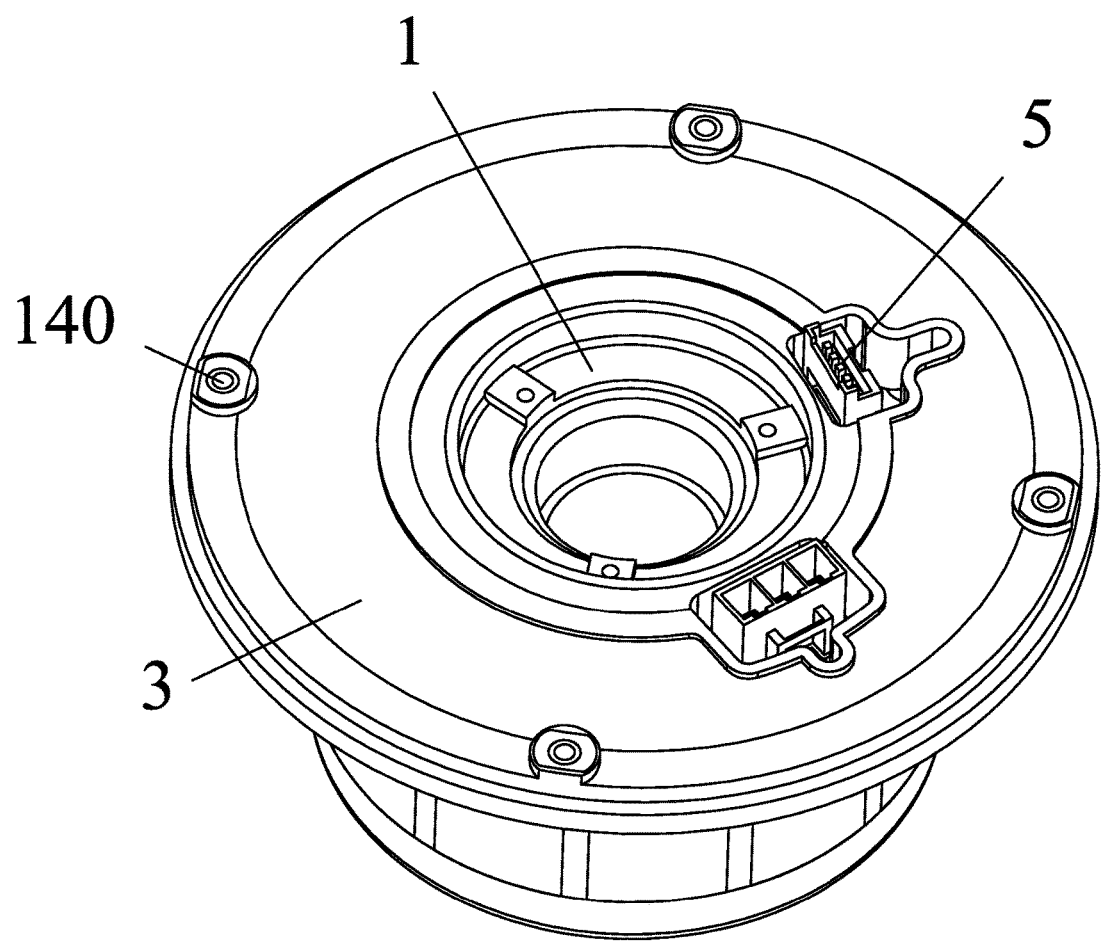
FIG. 1 is a stereogram of a plastic-packaged stator in accordance with one embodiment of the invention.
Figure 2:
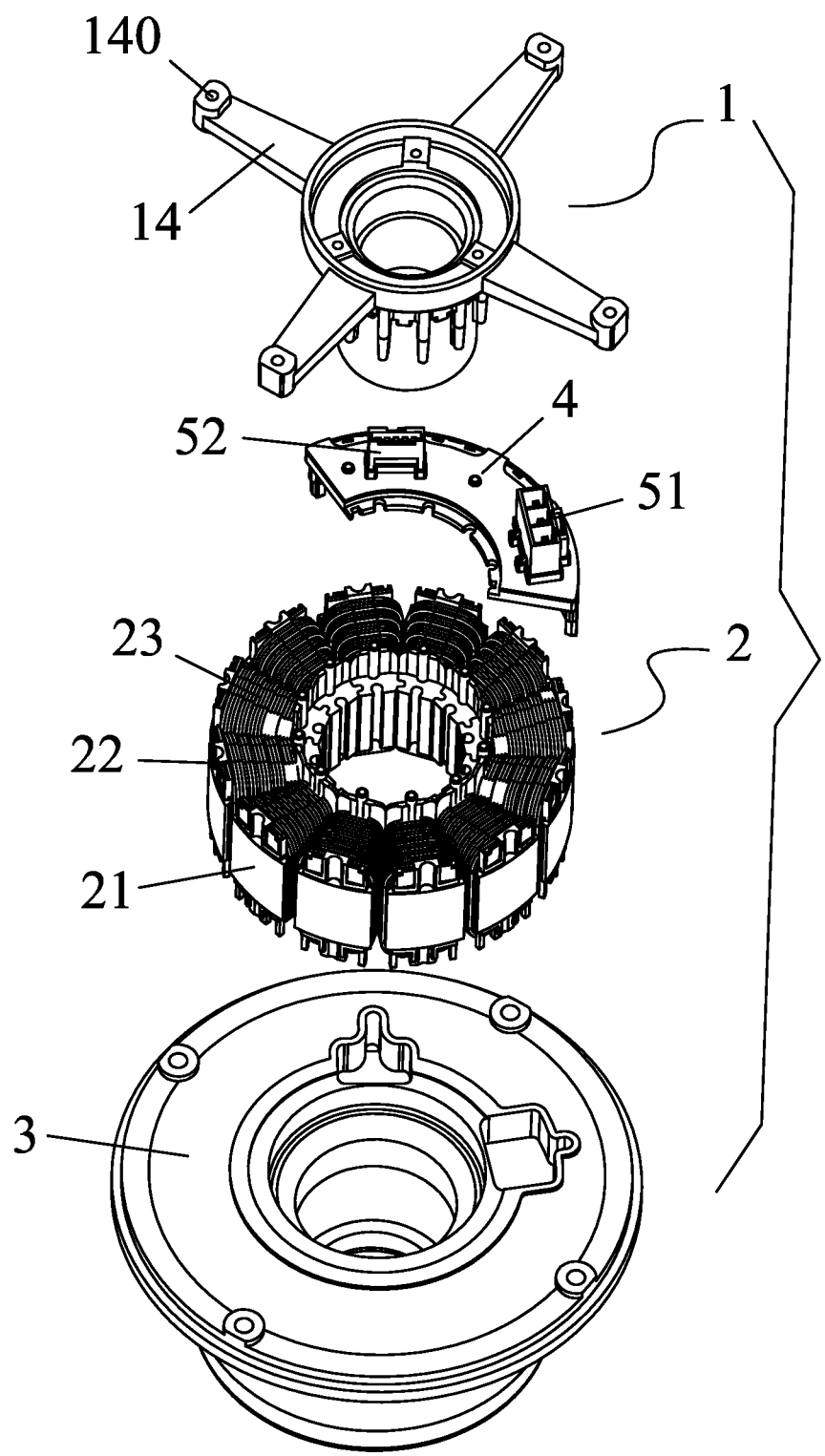
FIG. 2 is an exploded view of a plastic-packaged stator in accordance with one embodiment of the invention.
Figure 3:
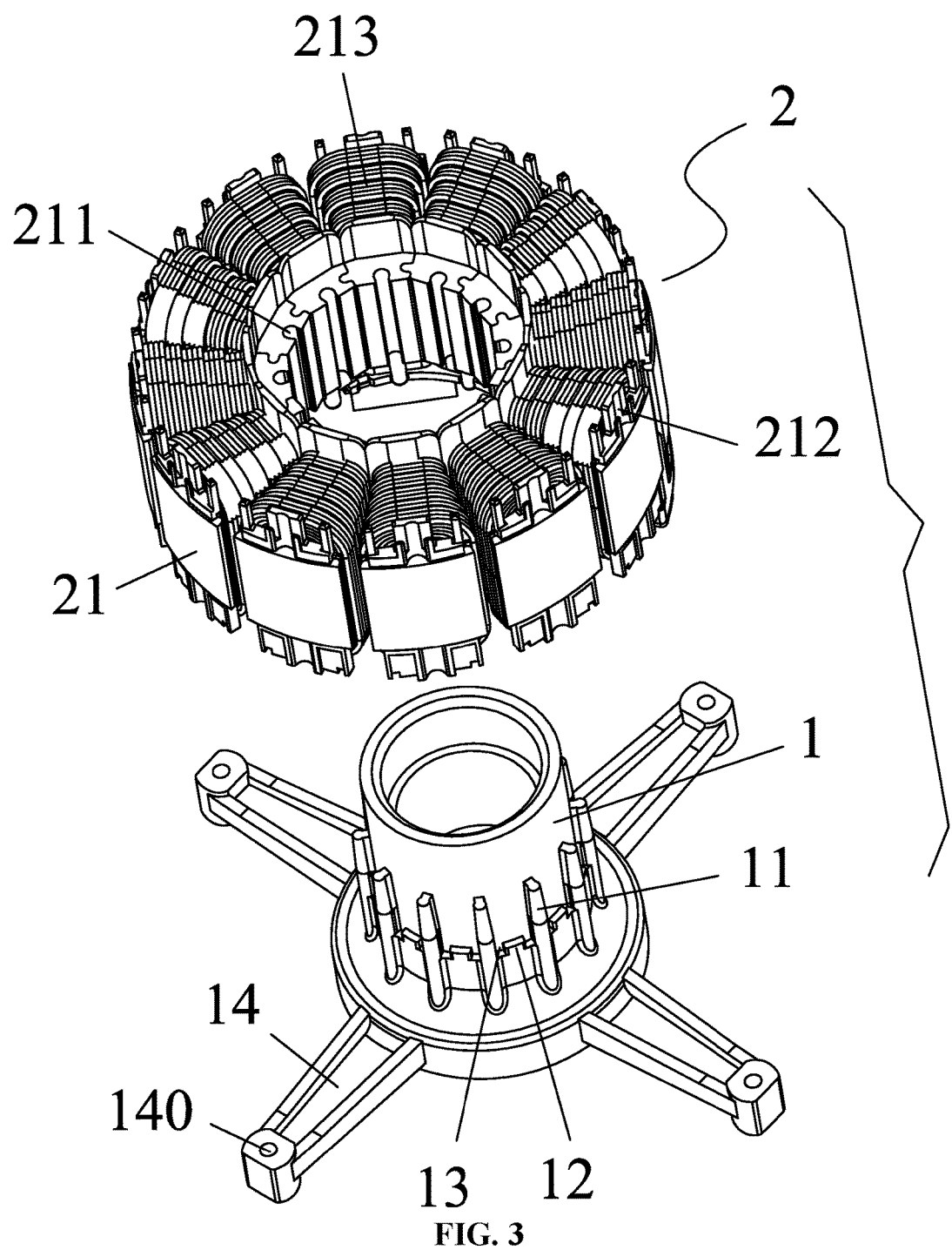
FIG. 3 is an exploded view of a plastic-packaged stator without a plastic-packaged body in accordance with one embodiment of the invention.
Figure 4:
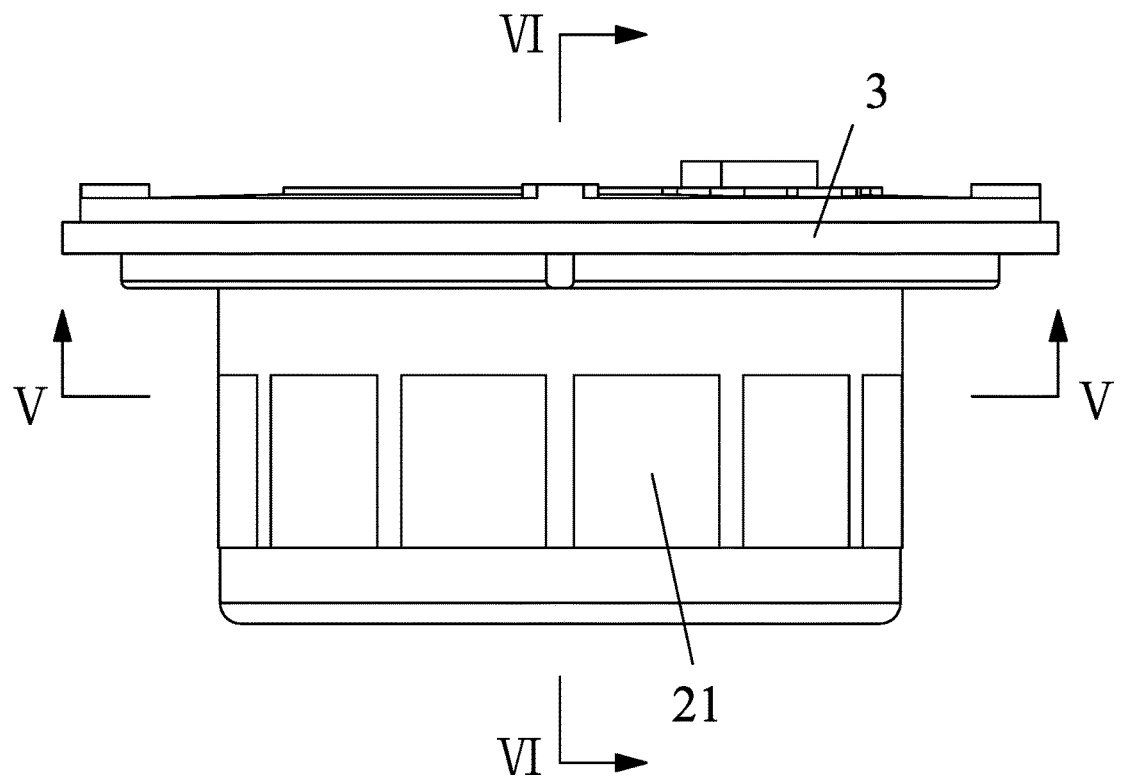
FIG. 4 is a front view of a plastic-packaged stator in accordance with one embodiment of the invention.
Figure 5:
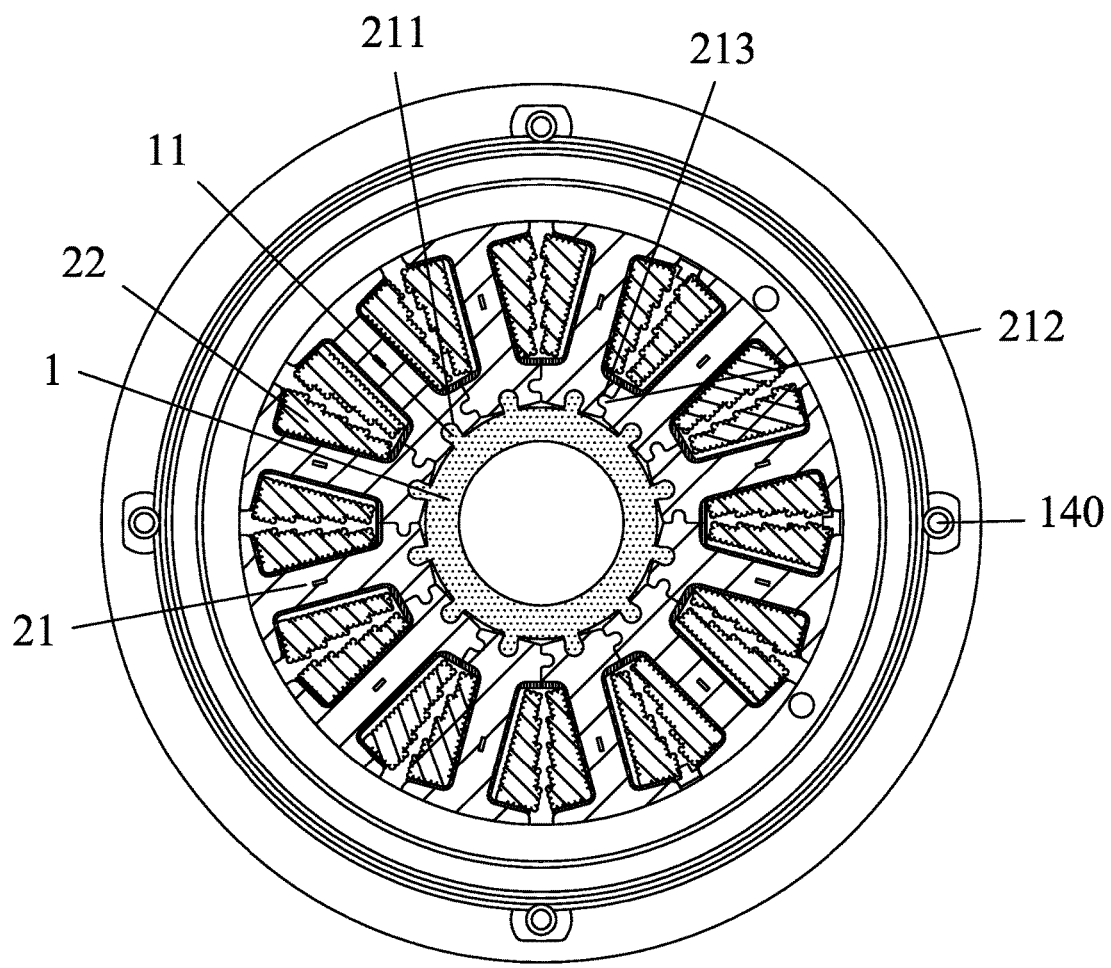
FIG. 5 is a cross-sectional view taken from line V-V in FIG. 4.
Figure 6:
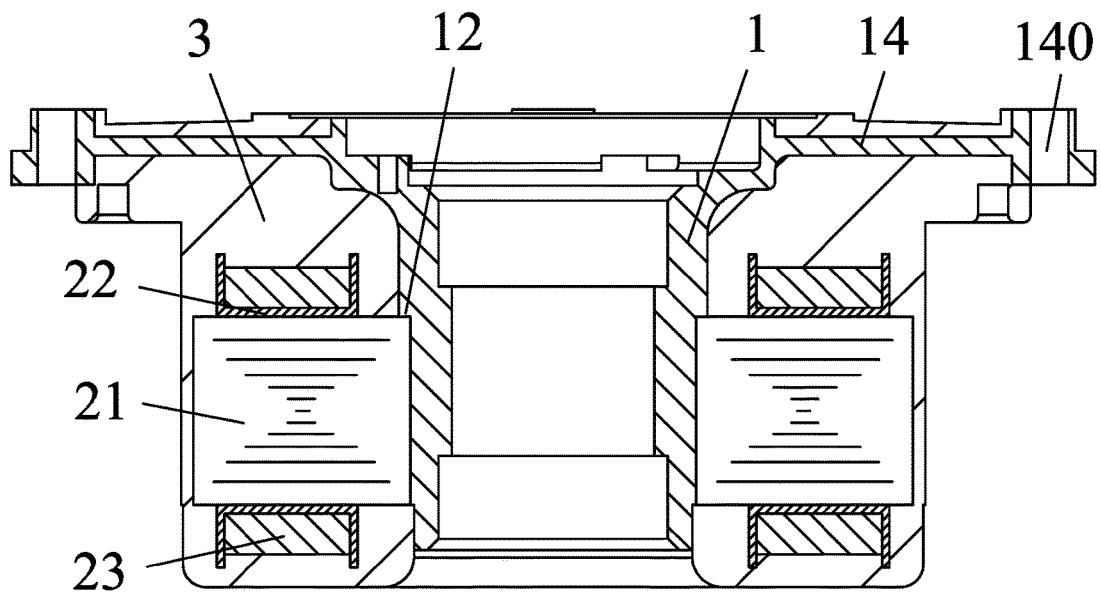
FIG. 6 is a cross-sectional view taken from line VI-VI in FIG. 4.

As shown in FIGS. 1-6, a plastic-packaged stator comprises a sleeve base 1, a plurality of tooth assemblies 2, and a plastic-packaged body 3. Each tooth assembly 2 comprises an iron core 21 comprising a plurality of laminated silicon steel sheets, a terminal insulator 22, and coil windings 23. The terminal insulator is disposed on one end of the iron core 21. The coil windings are coiled on the terminal insulator 22. A plurality of lug bosses 11 is circumferentially disposed at intervals on an outer wall surface of the sleeve base 1. An inner end of the iron core 21 comprises slots 211. The tooth assemblies 2 are circumferentially disposed on the outer wall surface of the sleeve base 1. The lug bosses 11 are embedded in the slots 211. The plastic-packaged body 3 integrates the sleeve base 1 with the tooth assemblies 2. One side of the inner end of the iron core 21 is provided with a bulge 212, and the other side is provided with a notch 213. The tooth assemblies 2 are circumferentially disposed on the outer wall surface of the sleeve base 1. The bulge 212 of one iron core 21 is embedded in the notch 213 of an adjacent iron core 21. A bump 12 is disposed between two adjacent lug bosses 11 on the outer wall surface of the sleeve base 1. An axial extension length of the bump 12 is smaller than an axial extension length of the lug bosses 11, and an open slot 13 is formed between the bump 12 and the lug bosses 11. A Hall plate assembly 4 is disposed on the tooth assemblies 2. A socket 5 is disposed on the Hall plate assembly 4. The plastic-packaged body 3 is sleeved on the Hall plate assembly 4, and the socket protrudes from the plastic-packaged body 3. The socket 5 comprises a three-position plug socket 51 and a five-position plug socket 52. The three-position plug socket is adapted to introduce three-phase line of the tooth assembly 2, and the five-position plug socket is adapted to connect the Hall plate assembly 4. A plurality of supporting arms 14 protrudes out of the sleeve base 1. Mounting holes 140 are disposed on an external end of the supporting arms 14. The plastic-packaged body 3 is sleeved on the supporting arms 14, with the mounting holes exposed.

Example 2

Figure 7:
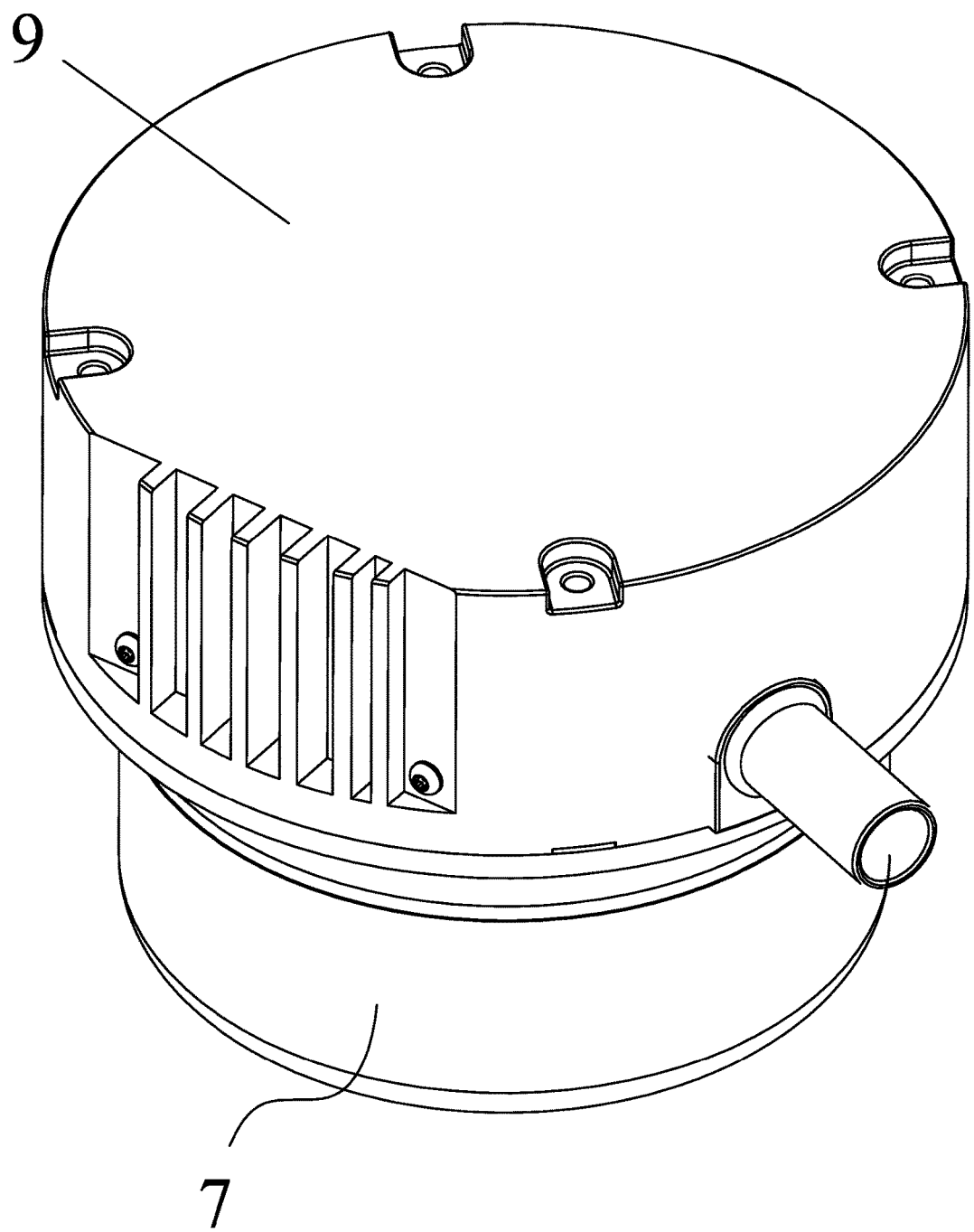
FIG. 7 is a stereogram of an external rotor motor in accordance with one embodiment of the invention.
Figure 8:
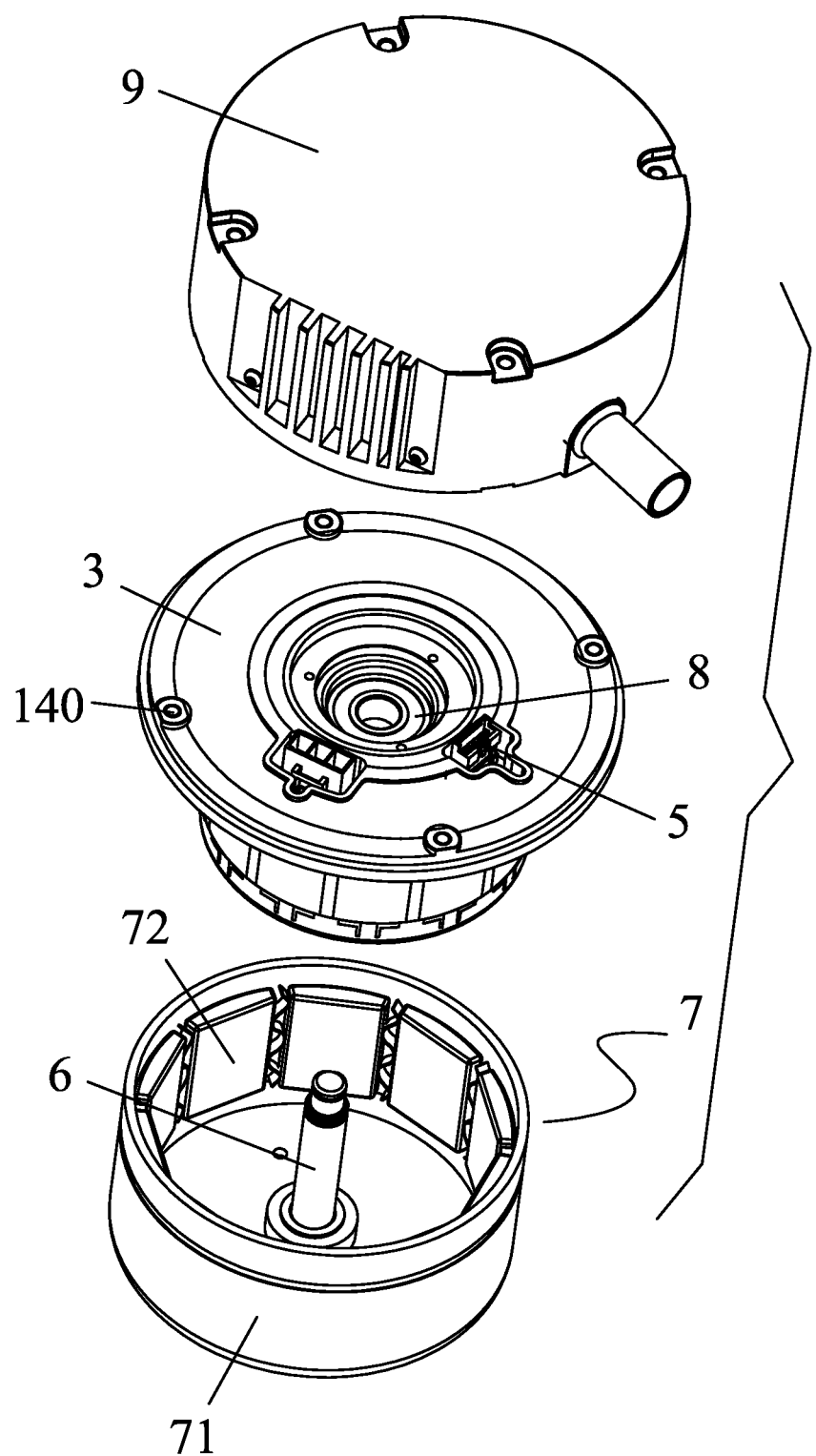
FIG. 8 is an exploded view of an external rotor motor in accordance with one embodiment of the invention.
Figure 9:
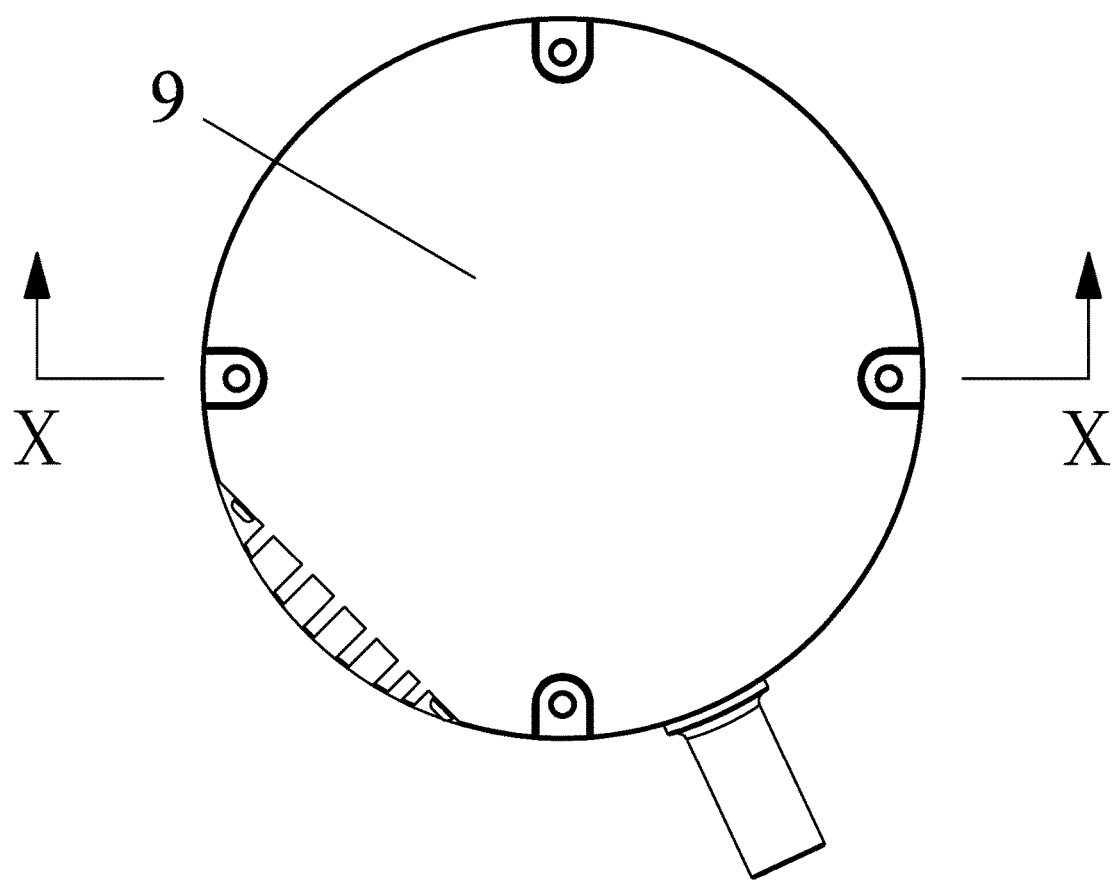
FIG. 9 is a top view of an external rotor motor in accordance with one embodiment of the invention.
Figure 10:
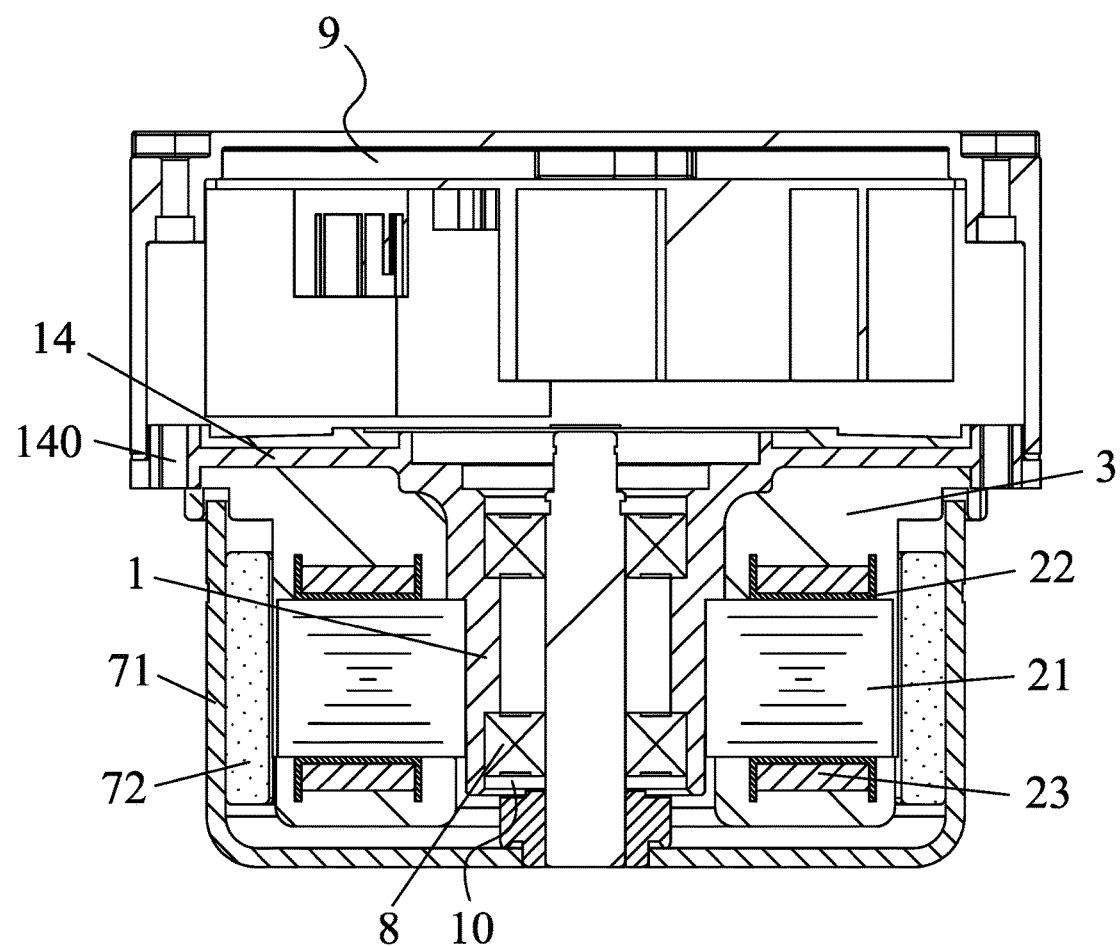
FIG. 10 is a cross-sectional view taken from line X-X in FIG. 9.

As shown in FIGS. 1-10, an external rotor motor comprises a rotary shaft 6, a plastic-packaged stator, and an external rotor 7. The plastic-packaged stator comprises a sleeve base 1. Bearing housings 10 are disposed on two ends of the sleeve base 1. Each bearing housing 10 comprises a bearing 8. The rotary shaft 6 is disposed in the sleeve base 1, and two ends of the rotary shaft are supported by the bearing 8. The external rotor 7 is sleeved on the plastic-packaged stator. The external rotor 7 comprises a shell sleeve 71 and a plurality of permanent magnets 72. The permanent magnets are mounted on an inner wall surface of the shell sleeve 71. One end of the rotary shaft 6 protrudes out from the sleeve base 1 and is connected to the shell sleeve 71. The plastic-packaged stator comprises a plurality of tooth assemblies 2 and a plastic-packaged body 3. Each tooth assembly 2 comprises an iron core 21 comprising a plurality of laminated silicon steel sheets, a terminal insulator 22, and coil windings 23. The terminal insulator is disposed on one end of the iron core 21. The coil windings are coiled on the terminal insulator 22. A plurality of lug bosses 11 is circumferentially disposed at intervals on an outer wall surface of the sleeve base 1. An inner end of the iron core 21 comprises slots 211. The tooth assemblies 2 are circumferentially disposed on the outer wall surface of the sleeve base 1. The lug bosses 11 are embedded in the slots 211. The plastic-packaged body 3 integrates the sleeve base 1 with the tooth assemblies 2. A controller 9 is mounted on the plastic-packaged body 3. A plurality of supporting arms 14 protrudes out of the sleeve base 1. Mounting holes 140 are disposed on an external end of the supporting arms 14. The plastic-packaged body 3 is sleeved on the supporting arms 14, with the mounting holes exposed. The controller 9 is disposed on the top of the plastic-packaged body 3, and is screwed via screws between the controller 9 the mounting holes 140.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A plastic-packaged stator, comprising:
   a sleeve base;
   a plurality of tooth assemblies, and
   a plastic-packaged body:
   wherein:
   each tooth assembly comprises an iron core comprising a plurality of laminated silicon steel sheets, a terminal insulator, and coil windings;
   the terminal insulator is disposed on one end of the iron core; the coil windings are coiled on the terminal insulator;
   a plurality of lug bosses is circumferentially disposed at intervals on an outer wall surface of the sleeve base;
   an inner end of the iron core comprises slots;
   the tooth assemblies are circumferentially disposed on the outer wall surface of the sleeve base;
   the lug bosses are embedded in the slots;
   the plastic-packaged body integrates the sleeve base with the tooth assemblies;
   a bump is disposed between two adjacent lug bosses on the outer wall surface of the sleeve base; and
   an axial extension length of the bump is smaller than axial extension lengths of the lug bosses, and an open slot is formed between the bump and a lug boss beside the bump.

2. The stator of claim 1, wherein one side of the inner end of the iron core is provided with a bulge, and the other side is provided with a notch; and the bulge of one iron core is embedded in the notch of an adjacent iron core.

3. The stator of claim 2, wherein a hall plate assembly is disposed on the tooth assemblies; a socket is disposed on the hall plate assembly; the plastic-packaged body is sleeved on the hall plate assembly, and the socket protrudes from the plastic-packaged body.

4. The stator of claim 1, wherein a hall plate assembly is disposed on the tooth assemblies; a socket is disposed on the hall plate assembly; the plastic-packaged body is sleeved on the hall plate assembly, and the socket protrudes from the plastic-packaged body.

5. The stator of claim 3, wherein the socket comprises a three-position plug socket and a five-position plug socket; and the three-position plug socket is adapted to introduce three-phase line of the tooth assemblies, and the five-position plug socket is adapted to connect the hall plate assembly.

6. The stator of claim 4, wherein the socket comprises a three-position plug socket and a five-position plug socket; and the three-position plug socket is adapted to introduce three-phase line of the tooth assemblies, and the five-position plug socket is adapted to connect the hall plate assembly.

7. The stator of claim 2, wherein a plurality of supporting arms protrudes out of the sleeve base; mounting holes are disposed on external ends of the supporting arms; the plastic-packaged body is sleeved on the supporting arms, with the mounting holes exposed.

8. The stator of claim 1, wherein a plurality of supporting arms protrudes out of the sleeve base; mounting holes are disposed on external ends of the supporting arms; the plastic-packaged body is sleeved on the supporting arms, with the mounting holes exposed.

9. An external rotor motor, comprising:
   a rotary shaft;
   a plastic-packaged stator, the plastic-packaged stator comprising a sleeve base comprising bearing housings, a plurality of tooth assemblies, and a plastic-packaged body; and
   an external rotor, the external rotor comprising a shell sleeve and a plurality of permanent magnets;
   wherein
   the bearing housings are disposed on two ends of the sleeve base; each bearing housing comprises a bearing; the rotary shaft is disposed in the sleeve base, and each end of the rotary shaft is supported by the bearing; the external rotor is sleeved on the plastic-packaged stator;
   the permanent magnets are mounted on an inner wall surface of the shell sleeve; one end of the rotary shaft protrudes out from the sleeve base and is connected to the shell sleeve; and
   each tooth assembly comprises an iron core comprising a plurality of laminated silicon steel sheets, a terminal insulator, and coil windings; the terminal insulator is disposed on one end of the iron core; the coil windings are coiled on the terminal insulator; a plurality of lug bosses is circumferentially disposed at intervals on an outer wall surface of the sleeve base; an inner end of the iron core comprises slots; the tooth assemblies are circumferentially disposed on the outer wall surface of the sleeve base; the lug bosses are embedded in the slots; the plastic-packaged body integrates the sleeve base with the tooth assemblies; a bump is disposed between two adjacent lug bosses on the outer wall surface of the sleeve base; and an axial extension length of the bump is smaller than axial extension lengths of the lug bosses, and an open slot is formed between the bump and a lug boss beside the bump.

10. The motor of claim 9, wherein a controller is mounted on the plastic-packaged body.

11. The motor of claim 10, wherein a plurality of supporting arms protrudes out of the sleeve base; mounting holes are disposed on external ends of the supporting arms; the plastic-packaged body is sleeved on the supporting arms, with the mounting holes exposed; and the controller is screwed on the mounting holes via screws.

\* \* \* \* \*